G. F. FLAMANT.
PROCESS FOR SEPARATING CAOUTCHOUC FROM RESINOUS PRODUCTS.
APPLICATION FILED MAY 14, 1910.
965,098.
Patented July 19, 1910.
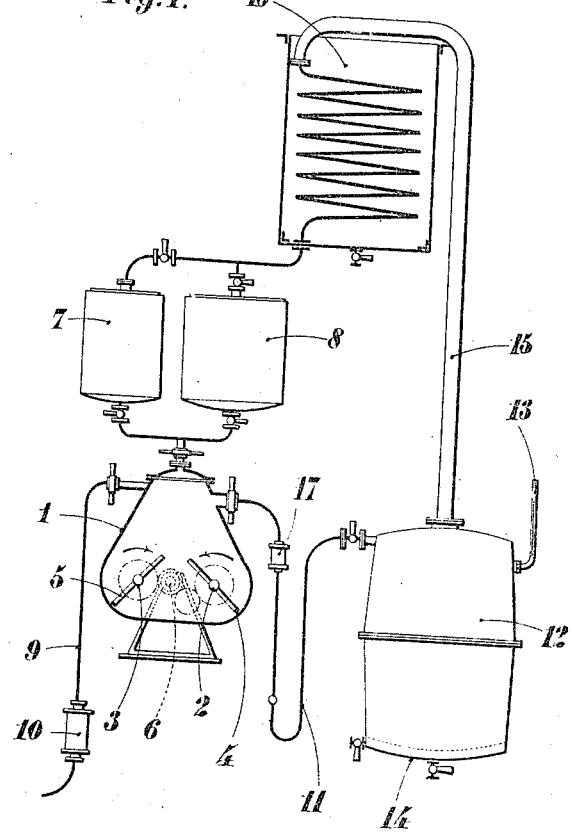
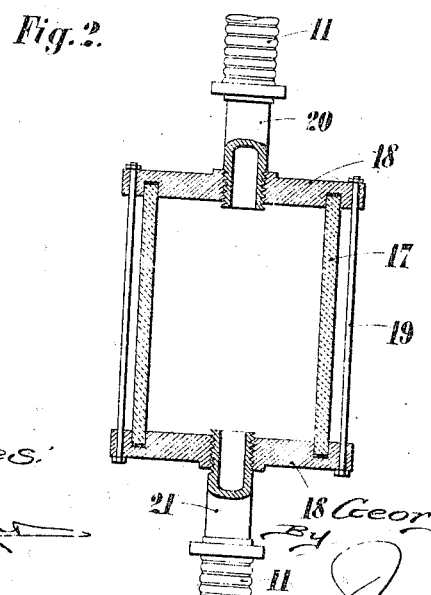

UNITED STATES PATENT OFFICE.

GEORGES FERDINAND FLAMANT, OF PARIS, FRANCE.

PROCESS FOR SEPARATING CAOUTCHOUC FROM RESINOUS PRODUCTS.

965,098.  Specification of Letters Patent.  Patented July 19, 1910.

Application filed May 14, 1910. Serial No. 561,387.

*To all whom it may concern:*

Be it known that I, GEORGES FERDINAND FLAMANT, a citizen of the French Republic, residing at Paris, Department of the Seine, in France, have invented certain new and useful Improvements in Processes for Separating Caoutchouc from Resinous Products, of which the following is a specification.

The invention has for its object a process for extracting caoutchouc from products whether natural or not which contain it. For this purpose a solvent for caoutchouc, such as for instance carbon bisulfid, benzin or carbon tetrachlorid is added to the mass to be treated in quantity just sufficient to bring the caoutchouc into a gelatinous state. The material is then treated with a substance which is capable of dissolving the resins or other impurities without dissolving the caoutchouc, for example a methyl or ethyl alcohol, or acetone. By means of a grinding apparatus a vigorous mastication of the material is then carried out and on account of its soft condition the mass lends itself well to comminution and only comparatively little power is required for the operation. This mastication brings about a complete solution of the resins. These are recovered by distillation and there remains in the apparatus a mass of pure caoutchouc which at the end of the mastication process is granulated and comminuted in extremely fine particles. The solvents remaining in the mass can therefore be completely removed, the removal being carried out by the aid of a vacuum.

In the accompanying drawing: Figure 1 represents diagrammatically an apparatus by means of which the process may be carried into effect, and Fig. 2 a detail view of the inspection tube.

The apparatus comprises a masticating chamber consisting of a vessel 1 in which two horizontal shafts 2 and 3 carrying blades 4 and 5 are mounted. These blades are rotated in opposite directions by means of suitable gearing operated by the driving shaft 6. The vessel 1 is mounted upon a support so that it can be tilted in order to decant the solvents containing the resins. Above the masticating apparatus two reservoirs 7 and 8 are situated, 7 containing the liquid employed to bring the caoutchouc into a gelatinous state and the other 8 the liquid which serves to dissolve the resins.

The vessel 1 is connected by a pipe 9 to a vacuum pump 10 and by means of flexible tube 11 to an evaporator 12 adapted to receive the liquids containing resins in solution. This vessel contains a thermometer 13 and is provided in its lower part with a heating chamber 14 into which is passed a current of steam. The upper part of the vessel 12 communicates by means of a pipe 15 with a condensing worm 16 which is connected to the reservoirs 7 and 8. On the flexible tube 11 between the masticating apparatus and the evaporator 12 there is provided an inspection tube allowing to inspect the liquid *i. e.* the solvents containing the resins during the decantation.

The inspection tube is of any type; in the drawings, it is illustrated as an apparatus consisting in a glass cylinder 17 which is placed between two plates 18, 18 and maintained by means of rods 19. The inspection tube is provided at one end with a tube 20 screwed directly in the walls or the cover of the vessel 1 or connected to the flexible tube 11 and at the other end with a tube 21 connected to the flexible tube 11.

The operation of the device is as follows: The mass containing the caoutchouc is placed in the comminuting apparatus and by means of suitable taps a certain quantity of liquid from reservoir 7 is supplied to the vessel so as to bring the caoutchouc into a gelatinous condition. The comminuting apparatus is then operated and liquid from reservoir 8 is admitted to dissolve the resins. The solvents containing the resins are then collected by decantation in the apparatus 12 by tilting the vessel 1 upon its support. This operation can be repeated several times in order to secure the complete extraction of the resins. By means of the inspection tube it is possible to watch the appearance of the liquid at what time it is necessary to stop the decantation. The vigorous mastication produced by the blades brings the mass of caoutchouc into a granulous condition. The shaft 6 of the masticating apparatus is then stopped and the vacuum pump 10 is operated in order to extract from the granulous mass remaining in the masticating apparatus the last traces of the solvents; the vessel 1 may advantageously be heated at the same time.

The evaporator 12 permits of a very rapid recovery of the auxiliary liquids employed. Owing to the difference in their boiling points they can be easily separated and their vapors condensed in the worm 16. The liquids recovered are successively led into their respective reservoirs 7 and 8 by a suitable manipulation of the cocks. The resins remain in the reservoir 12 whence they are removed.

This apparatus only requires a relatively small quantity of liquid compared with the quantity of resinous material which it is capable of treating. The complete recovery of the solvents contained in the mass of caoutchouc can be accomplished and consequently the apparatus permits of an economical and rapid treatment of the materials dealt with.

I claim:

The process for extracting caoutchouc from products containing the same which consists in adding to the product a solvent for caoutchouc in quantity just sufficient to bring the caoutchouc into a gelatinous state, submitting the same to a vigorous mastication by means of a comminuting apparatus having horizontal shafts and treating the mass by means of a solvent for the resins, these solvents being collected by decantation in an evaporating apparatus, the operation being repeated several times until a complete extraction of the resins has been effected, the caoutchouc remaining in the apparatus being freed from the last traces of solvent by the aid of a vacuum with or without the application of heat.

In testimony whereof I have hereunto set my hand in presence of two subscribing witnesses.

GEORGES FERDINAND FLAMANT.

Witnesses:
  H. C. COXE,
  EMILE KLOTZ.